United States Patent
Miyamoto et al.

(10) Patent No.: US 11,321,683 B2
(45) Date of Patent: May 3, 2022

(54) TOKENIZED DATA HAVING SPLIT PAYMENT INSTRUCTIONS FOR MULTIPLE ACCOUNTS IN A CHAIN TRANSACTION

(71) Applicant: PAYPAL, INC., San Jose, CA (US)

(72) Inventors: Alex Miyamoto, San Jose, CA (US); Gorka Sanchez, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 109 days.

(21) Appl. No.: 16/680,463

(22) Filed: Nov. 11, 2019

(65) Prior Publication Data

US 2020/0286053 A1   Sep. 10, 2020

Related U.S. Application Data

(63) Continuation of application No. 14/981,773, filed on Dec. 28, 2015, now Pat. No. 10,475,007.

(60) Provisional application No. 62/235,425, filed on Sep. 30, 2015.

(51) Int. Cl.
  *G06Q 40/00*  (2012.01)
  *G06Q 20/10*  (2012.01)
  *G06Q 20/26*  (2012.01)
  *G06Q 30/06*  (2012.01)

(52) U.S. Cl.
  CPC .............. *G06Q 20/10* (2013.01); *G06Q 20/26* (2013.01); *G06Q 30/0643* (2013.01)

(58) Field of Classification Search
  CPC ..... G06Q 30/0643; G06Q 20/26; G06Q 20/10
  USPC .......................................................... 705/27
  See application file for complete search history.

(56) References Cited

U.S. PATENT DOCUMENTS

| | | | |
|---|---|---|---|
| 2001/0037311 A1 | 11/2001 | McCoy et al. | |
| 2011/0106668 A1 | 5/2011 | Korosec et al. | |
| 2012/0072305 A1* | 3/2012 | Vadhri | G06Q 20/102 |
| | | | 705/26.41 |
| 2012/0290382 A1 | 11/2012 | Martin et al. | |
| 2012/0303491 A1* | 11/2012 | Hill | G06Q 30/06 |
| | | | 705/27.2 |

(Continued)

OTHER PUBLICATIONS

Peer-to-peer Direct Sales Adam Wierzbicki Polish-Japanese Institute of Information Technology adamw@pjwstk.edu.pl (Year: 2005).*

(Continued)

*Primary Examiner* — Bruce I Ebersman
*Assistant Examiner* — John A Anderson
(74) *Attorney, Agent, or Firm* — Haynes and Boone, LLP

(57) ABSTRACT

There are provided systems and methods for tokenized data having split payment instruction for multiple accounts in a chain transaction. A user may provide a payment to a merchant that sells one or more items to the user. In order to sell items, the merchant may utilize a partner service that provides resources for the merchant to sell the items, such as an online marketplace. The partner service may require a payment for each transaction by the merchant using the partner service. Thus, when a payment request is generated to the merchant for items sold to the user, the partner service may attach to the payment request and provide a split payment request for a split payment from the payment request. The payment between the user and merchant may be processed, and a separate transaction may provide the split payment automatically to the partner service from the merchant.

19 Claims, 4 Drawing Sheets

(56) References Cited

U.S. PATENT DOCUMENTS

| | | | |
|---|---|---|---|
| 2013/0218608 A1* | 8/2013 | Huson | G06Q 30/0603 |
| | | | 705/5 |
| 2014/0310080 A1* | 10/2014 | Salmon | G06Q 30/0233 |
| | | | 705/14.17 |
| 2014/0314215 A1 | 10/2014 | Duva et al. | |
| 2016/0267605 A1* | 9/2016 | Lingham | G06Q 40/12 |
| 2020/0311790 A1* | 10/2020 | Keren | G06Q 30/0282 |

OTHER PUBLICATIONS

Auletta, V. et al., A Web Service Based Micro-Payment System, Proceedings of the 11$^{th}$ IEEE Symposium on Computers and communications (ISCC '06), 6 pages, 2006.

* cited by examiner

__US 11,321,683 B2__

TOKENIZED DATA HAVING SPLIT PAYMENT INSTRUCTIONS FOR MULTIPLE ACCOUNTS IN A CHAIN TRANSACTION

CROSS REFERENCE TO RELATED APPLICATIONS

The present application is a continuation of and claims priority to U.S. patent application Ser. No. 14/981,773, filed Dec. 28, 2015, which claims priority to U.S. Provisional Patent Application Ser. No. 62/235,425, filed Sep. 30, 2015, which is incorporated by reference in its entirety.

TECHNICAL FIELD

The present application generally relates to an electronic payment mechanism and more specifically to tokenized data having split payment instruction for multiple accounts in a chain transaction.

BACKGROUND

Users may engage in online transactions with merchants in order to purchase items. Traditionally, online merchants may act as their own selling platform or marketplace, where the merchant resolves payment for items with a service provider, such as a payment provider, financial institution, and/or credit provider. However, merchants may also utilize an online marketplace, where the merchant may sell items through a platform provided by a partner service. The merchant may select the platform and/or partner service in order to receive more visibility for the merchant's items, based on the infrastructure and/or software capabilities of the platform, and/or other benefits the merchant may receive from use of the partner service. For use of the platform, the partner service may require a payment for each transaction, such as a flat fee or a percentage of the transactions price. The merchant and/or partner server may wish to utilize the payment provider for transaction processing and payment. However, payment by the payment provider to multiple entities during one transaction may be infeasible or difficult to properly handle.

Figure 1:
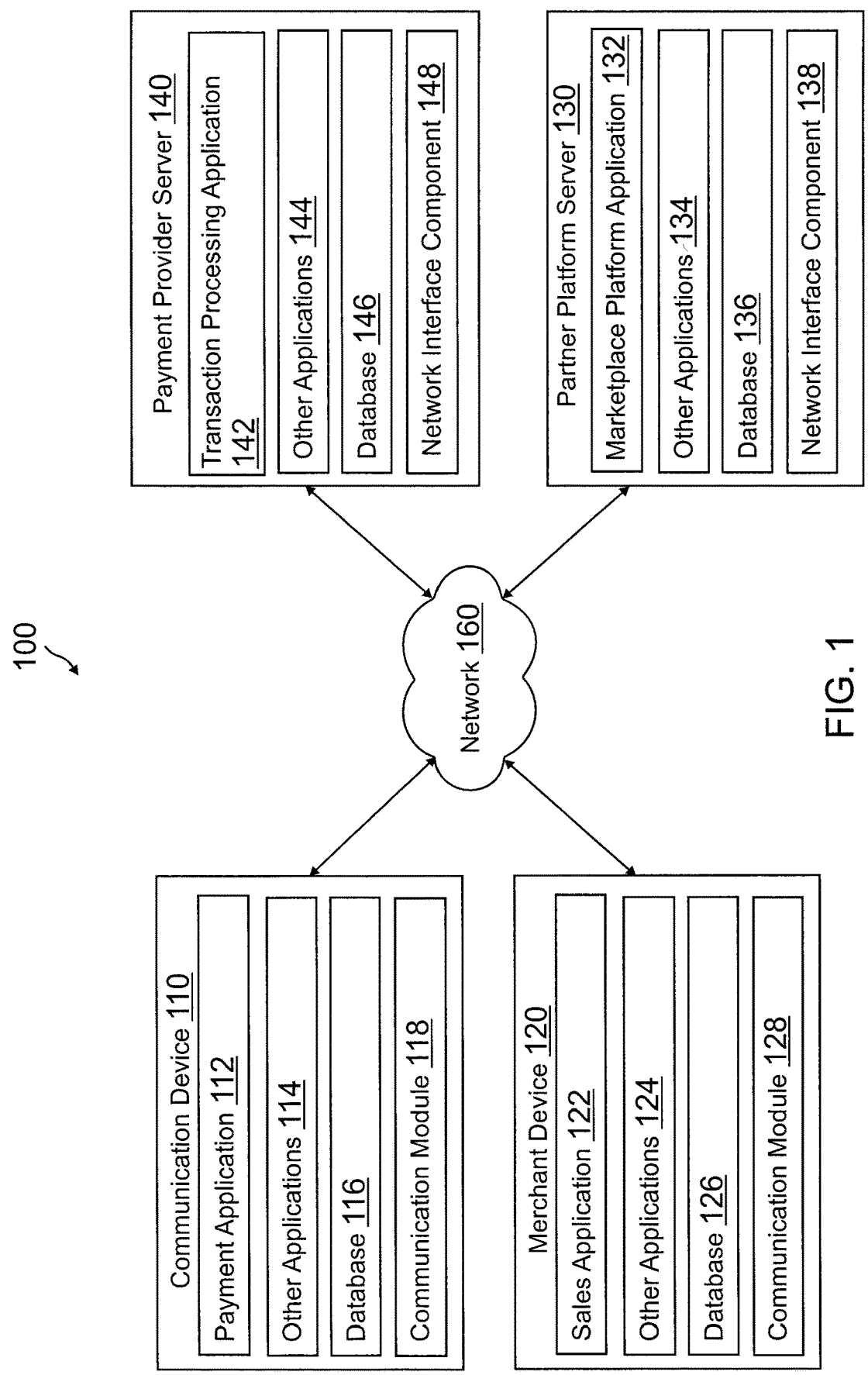
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for tokenized data having split payment instruction for multiple accounts in a chain transaction. Systems suitable for practicing methods of the present disclosure are also provided.

Merchants (e.g., a seller or payment receiver, such as a business, fundraiser, healthcare provider, landlord, etc.) may correspond to any person or entity selling goods and/or services (referred to herein as an "item" or "items") to other users/entities, such as buyers (e.g., a payer or payment sender, including a customer, donator, patient, renter, or other party). Service providers may include platform providers, commonly referred to as "partners," which may provide one or more online websites, applications, and/or other types of marketplace platform technology that one or more merchants may utilize to sell their items. In various embodiments, a partner may include a software architecture, shopping cart, payment gateway or payment processing platform, marketplaces, online & mobile solution providers, web developers, system integrators, billing platforms, or crowd funding or other social payment systems, eCommerce platforms, payment service providers, financial institutions, invoicing, point of sale, and many more. For example, a partner may offer software used to provide a website to a merchant and integrate use of a payment provider, or may offer an online marketplace that the merchant may utilize to offer products for sale. The partner may also request a fee for use of the partner services, such as a flat fee per transaction and/or a percentage fee of each transaction (e.g., total cost, cost pre-tax, cost per item purchased, etc.).

A payment provider may offer account services to various entities, which may include personal users and groups of users (e.g., companies), as well as merchants and service providers (e.g., partner service providers). The accounts with the payment provider may correspond to payment accounts, where a holder of the account may send and receive payments and otherwise engage in financial transactions. In order to establish a payment account, the payment provider may require information from the user/entity, including personal, merchant, financial, and/or authentication information. The information may also include information about partner agreements between merchants and partners, such as an agreed upon fee or whether there is a relationship between a merchant and a partner. The payment accounts may act as a payment instrument in a transaction, which may be processed to provide a payment (e.g., by debiting the account). Additionally, the payment accounts may also be used to receive a payment (e.g., by crediting the account).

The payment provider may process one or more types of payment instruments for a user, which may be utilized by the user to pay for and complete a transaction with a merchant. Types of payment instruments may include the aforementioned payment accounts with the payment provider, as well as financial accounts with other financial institutions, credit/debit cards, gift cards, and other types of funding sources. Thus, the user may also establish a payment account with the payment provider, for example, by providing personal and/or financial information to the payment provider and creating authentication credentials. These payment instruments may be used in a transaction through acceptance mechanisms that the merchant uses for acceptance of the payment mechanism. The user may shop with the merchant in an online environment (e.g., a website and/or application), and may select one or more items for purchase. The user may utilize a "checkout" interface that allows the user to initiate a transaction with the merchant and provide payment for the item(s). The user may provide the payment instrument on checkout and processing of the transaction. In order to process the payment instrument and receive payment, the merchant may utilize the payment provider.

In order to provide online shopping to the user by the merchant, the merchant may utilize the partner service. For example, the partner service may provide a website, online marketplace, dedicated application (e.g., executed by a communication device), interface, or other type of shopping layout that allows the user to view the merchant's items for sale, browse through the merchant's items, and select one or more items for sale. The partner service may further provide additional sales services, including transaction generation, purchase price determination, application of sales tax and other fees, addition of tip, delivery, or other surcharge, and/or other sales services, including inventory tracking and arrange pick-up/delivery of items. Service provided by the partner service may be requested by the merchant and the merchant may select and/or negotiate what services are required by the merchant and the cost of the services. In other embodiments, the merchant automatically agrees to use and pay for the sales services by posting items through the partner service's platform, and/or may only generally use the partner service platform with an associated cost. Using the partner service's platform, the merchant may then engage in transactions with users, for example, to sell one or more items.

Thus, the merchant may be required to provide payment to the partner service for use of the partner service's systems, infrastructure, software, network, websites/applications, and/or other available service. The partner service may further be integrated with the payment provider, for example, by providing the necessary framework to the merchant for payment processing with the payment provider. In other embodiments, the merchant may select to utilize the payment provider and the partner service may further request payment from the merchant through the payment provider. Thus, the partner service may have a payment account with the payment provider. Additionally, the partner service may register with the payment provider so that the payment provider is aware that the partner service requires payment for transactions conducted by one or more merchants when the merchant(s) utilizes the partner service for item sales.

Once the user has selected items for purchase from the merchant using at least a part of the partner service's platform, the user may cause a transaction to be generated. In various embodiments, the transaction may be generated using the platform of the partner service. In such embodiments, the platform may generate a total for the transaction and may request for the user to provide a payment instrument, such as the payment account of the user or another payment card, account, or other financial instrument. However, in other embodiments, the merchant may include processing systems to generate the transaction. After receiving the payment instrument, the merchant may cause a payment request to be generated (e.g., using the platform or other payment processing processes) for payment of the transaction. In various embodiments, the user may be required to enter additional checkout information, such as a name, delivery location, or other personal or financial information.

Once a transaction is initiated, the merchant may cause the payment request to be transmitted to the payment provider for the transaction, which may include the payment instrument and the payment (e.g., an amount) to be paid to the merchant by the user. The payment request may include further information, such as items purchased by the user, merchant information, platform information for the partner service, and/or information for the relationship between the partner service and the merchant. The payment request may correspond to tokenized payment data communicated to the payment provider over a network, or may otherwise be provided to the payment provider for processing. The payment provider may process the payment request by obtaining payment using the payment instrument, which may correspond to withdrawal of the payment amount from a payment account of the user, or may include processing a debit/credit card, requesting a transfer from a financial institution, or otherwise obtaining payment. For example, a backend financial institution, credit provider, or other entity may be utilized by the payment provider to receive the payment amount where the user does not have or does not provide a payment account with the payment provider. The payment provider may then provide the payment to the merchant, for example, by crediting a payment account with the payment provider for the merchant.

The tokenized payment data may further include information that indicates that the transaction resulted from use of the partner service by the merchant. For example, the tokenized payment data may include data that indicates the transaction was conducted on the partner service's online marketplace. In various embodiments, the partner service may attach split payment information to the payment request when the payment request is transmitted to the payment provider. Thus, the payment provider may further be automated to provide payment to the partner service from the merchant. The payment provider may access a split fee agreed upon between the merchant and the partner service. In various embodiments, split fee information may correspond to data received from the partner service that dictates the amount of a split fee for a transaction that the partner service receives. The merchant and partner service may agree to the split fee, such as when the merchant signs up to use the partner service and/or when the merchant posts one or more items for sale with the merchant. For example, the partner service may require 5% or $5 of every transaction performed by the merchant using the partner service. In other embodiments, the split fee information may include a negotiable amount agreed to by the merchant and partner service, which may be set before the transaction by one or more of the merchant and the partner service. The split fee information may also correspond to adjustable fees, which may change based on a tiered level program. The adjustable fees may depend on what the merchant enrolls in (e.g., a gold tier, silver tier, etc.), and may be changed based on the merchant's characteristics and historical data (e.g., sales, length of use of the partner service, contract, etc.). The partner service may also adjust the split fee amount per transaction, for example, if the merchant exceeds weekly, monthly, total transaction amounts, number of transactions, etc. The split fee amount may also be contingent on the transaction and/or the transaction amount, for example, items in the transaction, a size of the transaction, and/or a total price for the transaction. Thus, the payment provider may receive data from the merchant and/or partner service to determine the split fee required to be paid to the partner service, or may collect transaction data from one or more sources, including the payment provider, to determine the split fee where the split fee may be adjustable. In various other embodiments, the fee agreement and fee determined between the merchant and partner service may be stored to the payment provider or may be received in a payment request.

Once the split fee amount due to be paid by the merchant to the payment provider for the transaction is determined, the payment provider may interact with the partner service to provide payment to the partner service. In this interaction, the merchant may act as the payer for a second transaction with the partner service as the payee. The payment provider may debit the merchant's payment account the amount for the split fee and may provide the amount to the partner service by crediting a payment account for the partner service. As payment for this transaction between the merchant and the partner service for the split fee occurs without the user, and thus, the user is aware of (e.g., views on an account statement) of only one payment to the merchant. The payment provider instead performs this transaction for the split fee between the merchant and the service provider. The merchant may provide their account identifier for their payment account during setup with the payment provider for use of the partner service, or the merchant's account identifier may be retrieved from the initial payment request. Moreover, an API call to the payment provider may be executed by the partner service and/or the partner service's platform to initiate receipt of the split fee payment, which may include the merchant's account identifier. However, in other embodiments, the payment provider may be automated to automatically debit the merchant's account and credit the payment of the partner service on receipt of the payment request between the user and the merchant and determination that the transaction for the payment request utilizes the partner service.

Thus, the user may view an account statement that reflects the payment between the user and the merchant. The merchant may further review an account statement that shows the payment received from the user, as well as the payment sent to the partner service for use of the partner service. The payment sent to the partner service may further display information for the transaction between the user and the merchant causing the payment. Based on the transaction and/or the payment by the merchant to the partner service, the partner service may adjust the split fee amount internally so that a next payment request having an attached split fee amount for the payment in the payment request may have a different split fee amount. The partner service may further notify the merchant of the change to the split fee amount.

In various embodiments, the incoming payment request from a transaction between a merchant and a user may correspond to multiple payments to other services. For example, the payment request may be received from a merchant or partner service that offers a bundled service and/or items, such as a travel agent. In such embodiments, the entity originating the payment request for payment from a user may further require parts of the payment sent out to other entities, such as an airline, hotel, entertainment rental, car rental, etc. In other embodiments, the merchant may utilize multiple partner services that each attach a split fee amount. In such embodiments, the payment provider may process the split fee amounts attached to the payment request by providing full payment from the payment request to the entity originating the payment request (e.g., the merchant or partner service). Thus, the user still only views a payment to the entity the user is interacting with. The payment provider may then automatically debit the account of the entity originating the payment request (e.g., the merchant or partner service) in order to provide payment to the multiple other entities requiring payment (e.g., other merchants and/or partner services).

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, a partner platform server 130, and a payment provider server 140 in communication over a network 150. A user (not shown) may establish a user payment account with payment provider server 140, which may be used to provide payments to a merchant (not shown) associated with merchant device 120 through a merchant payment account. Additionally, the merchant may utilize services offered by partner platform server 130, including a platform used to sell items and process payments for items using payment provider server 140. The partner service (not shown) for partner platform server 130 may utilize a partner payment account with payment provider server 140 to receive split fee payments from the merchant. Thus, when the user utilizes communication device 110 to provide a payment to the merchant through merchant device 120, payment provider server 140 may provide payment to the merchant payment account from the user payment account. Payment provider server 140 may then process a separate split fee payment transaction, which may debit the merchant payment account an amount of the split fee and credit the partner payment account.

Communication device 110, merchant device 120, partner platform server 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with payment provider server 140 and/or merchant device 120. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment application 120, other applications 114, a database 116, and a network interface component 118. Browser/payment application 120 and other applications 114 may correspond to executable processes, procedures, and/or applications with associated hardware. In other embodiments, communication device 110 may include additional or different modules having specialized hardware and/or software as required.

Payment application 120 may correspond to one or more processes to execute modules and associated devices of communication device 110 to initiate, receive, and/or process/complete transactions using services provided by payment provider server 140. In this regard, payment application 120 may correspond to specialized hardware and/or software utilized by communication device 110 to provide an interface to permit the user associated with communication device 110 to select payment options and provide payment for items, for example, to a merchant through merchant device 120 using payment provider server 140. In various embodiments, payment application 120 may also provide payments and/or transfers to users and/or groups of users, for example, payments to individual sellers or friends for items and/or transfers between known associates. Payment application 120 may be implemented as a user interface enabling the user to enter payment options for storage by communication device 110, select and provide payment options on checkout/payment of one or more items with a merchant, and complete a transaction for the item(s) through a purchase request for the item(s). In various embodiments, payment application 120 may include a general browser application configured to retrieve, present, and communicate information over the Internet (e.g., utilize resources on the World Wide Web) or a private network. For example, payment application 120 may provide a web browser, which may send and receive information over network 150, including retrieving website information, presenting the website information to the user, and/or communicating information to the website, including payment information. However, in other embodiments, payment application 120 may include a dedicated application of payment provider server 140 or other entity (e.g., a merchant), which may be configured to assist in processing purchase requests.

As discussed herein, payment provider server 140 may be used to provide payment to the merchant associated with merchant device 120. Payment application 120 may be used during checkout for a transaction with the merchant. In such embodiments, payment application 120 may correspond to a dedicated application and/or a web browser, which may provide the payment to the merchant through merchant device 120. The merchant may receive payment instrument information, or payment application 120 may process the payment through payment provider server 140. Thus, payment application 120 may be utilized to select payment instrument(s) for use during a transaction between the user and the. Payment application 120 may utilize user financial information, such as a credit card, bank account, or other financial account, as a payment instrument when providing payment information for use in the authentication mechanism. Additionally, payment application 120 may utilize a user account with payment provider, such as payment provider server 140, as the payment instrument. The user may therefore cause a transaction to be generated that includes a payment request to the merchant for one or more items for purchase. The transaction may be communicated to payment provider server 140 for processing. Payment application 120 may be utilized to view the results of the transaction and/or for viewing and storage of a transaction history, such as a receipt. Thus, the user may view the transaction between the user and the merchant. However, the split fee payment to the partner service associated with partner platform server 130 may be hidden from the user, as discussed herein.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications. Other applications 114 may also include other location detection applications, such as a mapping, compass, and/or GPS application. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with browser/payment application 120 and/or other applications 114, identifiers associated with hardware of communication device 110, or other appropriate identifiers, such as identifiers used for payment/user/device authentication or identification. Database 116 may include transaction information, as well as payment instruments for a transaction. Additionally, received transaction histories may be stored to database 116.

Communication device 110 includes at least one network interface component 118 adapted to communicate with merchant device 120 and/or payment provider server 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 120 may be maintained, for example, by a merchant or other entity selling one or more items to users, which may include single users or groups of independent users as well as small and large branded merchants. Merchant device 120 may also interact with partner platform server 130 to provide the items for sale, including use of various software, infrastructure, websites, applications, and/or other platforms for advertisement, sale, and payment processing. In this regard, merchant device 120 may include a device having processing applications, which may be configured to interact with communication device 110, partner platform server 130, and/or payment provider server 140 to engage in transactions. Merchant device 120 may be implemented using any appropriate hardware and software configured for wired and/or wireless communication with communication device 110 and/or payment provider server

140. For example, in one embodiment, merchant device 120 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. In this regard, merchant device 130 may instead correspond to a server device or other type of computing architecture used to provide sales of items from a merchant. Although only one merchant device is shown, a plurality of merchant devices may function similarly.

Merchant device 120 of FIG. 1 contains a sales application 122, other applications 124, a database 126, and a communication module 128. Sales application 122 and other applications 124 may correspond to processes, procedures, and/or applications executable by a hardware processor, for example, a software program. In other embodiments, merchant device 120 may include additional or different modules having specialized hardware and/or software as required.

Sales application 122 may correspond to one or more processes to execute modules and associated specialized hardware of merchant device 160 that provide checkout and payment processes for a transaction to purchase one or more items for sale from the merchant corresponding to merchant device 160. In this regard, sales application 122 may correspond to specialized hardware and/or software of merchant device 160 to provide a convenient interface to permit a merchant offer items for sale. For example, sales application 122 may be implemented as an application offering items for sale that may be accessed by communication device 110 to present the items for sale to the user associated with communication device 110. In certain embodiments, sales application 122 may correspond to a website available over the Internet and/or online content and/or database information accessible through a dedicated application. Thus, sales module 160 may provide item sales through an online marketplace using the website of the merchant. In various embodiments, one or more of the features of sales application 122 may be provided by partner platform server 130, such as integrated payment processing. For example, the merchant associated with merchant device 130 may not have a website and may utilize an online marketplace accessible via a website or dedicated application of partner platform service 130. Moreover, sales application 122 may integrate with an online platform provided and maintained by partner platform server 130, such as an online marketplace. In such embodiments, sales application 122 may provide information to partner platform server 130 for use in the online platform, and may process payments by the user associated with communication device 110 through the online platform and using payment provider server 140. In various embodiments, sales application 122 may also be used to negotiate a split fee amount with partner platform server 130 and/or approve the split fee amount taken by partner platform server 130.

Thus, sales application 122 may be used to establish a transaction once the user associated with communication device 110 has selected one or more items for purchase. Once a payment amount is determined for the transaction for the item(s) to be purchased by user 102, sales application 122 may request payment from user 102. Sales application 122 may receive payment processing information, such as a payment instrument. Sales application 122 may then process a payment to the merchant associated with merchant device 120 using the payment instrument by communicating a payment request to payment provider server 140 with the payment instrument and authorization/authentication provided by the user associated with communication device 110. However, in other embodiments, the payment request may be sent by marketplace platform application 132 of partner platform server 130, which may include the merchant identification (as well as any identification of partner platform server 130, such as identification of the platform used for the transaction). In such embodiments, the payment request may be processed, payment provided to the merchant account, and notification of payment (or failure, for example, where there are insufficient user funds) may be sent to sales application 122. Sales application 122 may then receive the results of the transaction processing, and complete the transaction with user 102, for example, by providing the user the items for the transaction or declining the transaction where user 102 is not authenticated or the transaction is not authorized (e.g., insufficient funds). Sales application 122 may also be used to view payments made for split fees amounts to partner platform server 130.

Merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking, online payments, money transfer, or other applications associated with payment provider server 140. Other applications 134 may contain software programs, executable by a processor, including a graphical user interface (GUI) configured to provide an interface to the user.

Merchant device 120 may further include database 126 which may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. Identifiers in database 126 may be used by a payment/credit provider, such as payment provider server 140, to associate merchant device 120 with a particular account maintained by the payment/credit provider. Item information for items sold by the merchant associated with merchant device 120 may be stored to database 126. Database 126 may further include transaction information and/or results, including transaction histories.

Merchant device 120 includes at least one communication module 128 adapted to communicate with communication device 110 and/or payment provider server 140. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Partner platform server 130 may be maintained, for example, by a service provider, which may be partnered with merchant device 120 and/or payment provider server 140 and provide a platform or other resources for use in sales and payment processing to merchants. In this regard, partner platform server 130 includes one or more processing applications which may be configured to interact with communication device 110, merchant device 120, and/or payment provider server 140 to facilitate sales and transaction processing and receive a split fee payment for services. In one example, partner platform server 130 may be provided by EBAY®, Inc. of San Jose, Calif., USA. However, in other embodiments, partner platform server 130 may be maintained by or include a credit provider, financial services provider, financial data provider, and/or other service provider, which may provide payment services to the user.

Partner platform server 130 of FIG. 1 includes a marketplace platform application 132, other applications 134, a database 136, and a network interface component 138. Marketplace platform application 132 and other applications 134 may correspond to executable processes, procedures, and/or applications with associated hardware. In other embodiments, partner platform server 130 may include additional or different modules having specialized hardware and/or software as required.

Marketplace platform application 132 may correspond to one or more processes to execute modules and associated specialized hardware of partner platform server 130 to provide services to merchant device 120 for use in item sales and/or payment processing using payment provider server 140. In this regard, marketplace platform application 132 may correspond to specialized hardware and/or software to provide software, hardware, infrastructure, advertisements, payment processing services, and/or additional information and resources that assist the merchant associated with merchant device 120 in selling items. For example, marketplace platform application 132 may correspond to an online marketplace, accessible on a website or through a dedicated application, which lists items for sale from one or more merchants and provides software and payment processing infrastructure to processing payments by a user to the merchant using payment provider server 140.

Thus, the merchant may utilize sales application 122 to interface with marketplace platform application 132 and list items for sale and/or provide an inventory of available items. However, in other embodiments, marketplace platform application 132 may correspond to other available services and information, including software development kits, software add-ons, available processing infrastructure, and/or advertisement assistance, which may assist the merchant in selling items. Moreover, the partner service associated with partner platform server 130 may require a fee for usage of marketplace platform application 132, which may correspond to a flat fee, percentage fee, and/or adjustable fee. Additionally, merchants may enroll in a tiered system or levels, which may change the required fee. Marketplace platform application 132 may be used to attach a split fee payment request for the percentage of the transaction payment owed to partner platform server 130 to the payment request for the transaction payment between the merchant associated with merchant device 130 and the user associated with communication device 110. Thus, the split fee request may be attached to the payment request when the payment request is received by transaction processing application 142 of payment provider server 140. In other embodiments, marketplace platform application 132 may otherwise send the split fee request, which may or may not identify the associated transaction. For example, the split fee request may be a general payment request by partner platform server 130, or may be a split fee identifying a payment request that partner platform server 130 is owed a portion of.

In various embodiments, partner platform server 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing payment provider server 134. In various embodiments where not provided by marketplace platform application 132, other applications 134 may include connection and/or communication applications, which may be utilized to communicate information to over network 150.

Additionally, partner platform server 130 includes database 136, which may include, for example, identifiers such as operating system registry entries, cookies associated with marketplace platform application 132 and/or other applications 134, identifiers associated with hardware of partner platform server 130, or other appropriate identifiers. Identifiers in database 126 may be used by a payment/credit provider, such as payment provider server 140, to associate partner platform server 130 with a particular account maintained by the payment/credit provider. Additionally, platform information for a platform provided by partner platform server 130 may be stored to database 136.

In various embodiments, partner platform server 130 includes at least one network interface component 138 adapted to communicate communication device 110, merchant device 120, and/or payment provider server 140 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 140 may be maintained, for example, by an online payment service provider, which may provide payment services and/or processing for financial transactions on behalf of users. In this regard, payment provider server 140 includes one or more processing applications which may be configured to interact with communication device 110, merchant device 120, and/or partner platform server 130 to facilitate payment for a transaction, including establishment of payment accounts and payments for a transaction between a user and a merchant and split fee amounts for the merchant's use of a partner service's platform to generate the transaction. In one example, payment provider server 140 may be provided by PAYPAL®, Inc. of San Jose, Calif., USA. However, in other embodiments, payment provider server 140 may be maintained by or include a credit provider, financial services provider, financial data provider, and/or other service provider, which may provide payment services to the user.

Payment provider server 140 of FIG. 1 includes a transaction processing application 142, other applications 134, a database 146, and a network interface component 148. Transaction processing application 142 and other applications 144 may correspond to executable processes, procedures, and/or applications with associated hardware. In other embodiments, payment provider server 140 may include additional or different modules having specialized hardware and/or software as required.

Transaction processing application 142 may correspond to one or more processes to execute modules and associated specialized hardware of payment provider server 140 to receive and/or transmit information from communication device 110 for establishing payment accounts, as well as processing and completing of one or more funding transactions initiated using the payment accounts. In this regard, transaction processing application 142 may correspond to specialized hardware and/or software to establish payment accounts, which may be utilized to send and receive payments and monetary transfers and engage in other financial transactions. A user associated with communication device 110 may establish a payment account with transaction processing application 142 by providing personal and/or financial information to payment provider server 140 and selecting an account login, password, and other security information. Similarly, the merchant associated with merchant device 120 may provide merchant information and financial information, and the partner service associated with partner platform server 130 may provide partner information and financial information. The payment accounts may be used to send and receive payments. The payment accounts may be accessed and/or used through a browser application and/or dedicated payment application executed by communication device 110. Transaction processing application 142 may receive a payment request from communication device 110 and/or merchant device 120 for a transaction between the user and the merchant. The payment request may include transaction terms and a payment instrument identified by the user. Thus, the payment request may be generated using a platform provided by partner platform server 130. Transaction processing application 142 may provide payment to the merchant using the payment instrument, and may provide a transaction history to communication device 110, merchant device 120, or store the history with one or more accounts.

The payment may be provided to the merchant's payment account with payment provider server 140. Additionally, transaction processing application 142 may access a split fee payment request for a split fee owed to the partner service associated with partner platform server 130 for use of the partner service's platform during the transaction. The split fee request may be received from merchant device 120 and/or partner platform server 130 based on the payment request and may be preset with payment provider server 140 (e.g., stored to database 136) and/or attached to the payment request. For example, the merchant corresponding to merchant device 130 and the partner service associated with partner platform server 140 may agree to a fee and store the fee to payment provider server 140 for use in receive transactions. In other embodiments, partner platform server 130 may determine the split amount using a split fee agreement and attach a split fee request to a payment request generated by the merchant using the services of partner platform server 130. Thus, transaction processing application 142 may process the split fee payment request by debiting the amount for the split fee from the merchant's payment account and credited to the partner's payment account. Processing of the split fee payment may occur substantially without request by merchant device 120 and/or partner platform server 130 based on information in the original payment request. For example, the original payment request may include data used to determine that the partner service's platform was used (e.g., an identifier for the platform, such as a website address sending the payment request or embedded data in the payment request). However, in other embodiments, partner platform server 130 may perform an API call to transaction processing application 142, which may process the split fee payment request and provide a split fee payment to the partner through the merchant's payment account and the partner's payment account. In such embodiments, the split fee request may be attached to or otherwise come from partner platform server 130 after generation of the payment request for the transaction.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing payment provider server 134. In various embodiments where not provided by transaction processing application 142, other applications 144 may include connection and/or communication applications, which may be utilized to communicate information to over network 150.

Additionally, payment provider server 140 includes database 146. As previously discussed, the entity corresponding to communication device 110, merchant device 120, and/or partner platform server 130 may establish one or more payment accounts with payment provider server 140. Payment accounts in database 146 may include entity information, such as name, address, birthdate, merchant information, partner information, payment/funding information, additional user financial information, and/or other desired user data. The entity may link to their respective payment accounts through an account, user, merchant, partner, and/or device identifier. Thus, when an identifier is transmitted to payment provider server 140, e.g. from communication device 110 and/or merchant device 120, a payment account belonging to the entity may be found.

In various embodiments, payment provider server 140 includes at least one network interface component 148 adapted to communicate communication device 110, home device 130, and/or merchant device 120 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
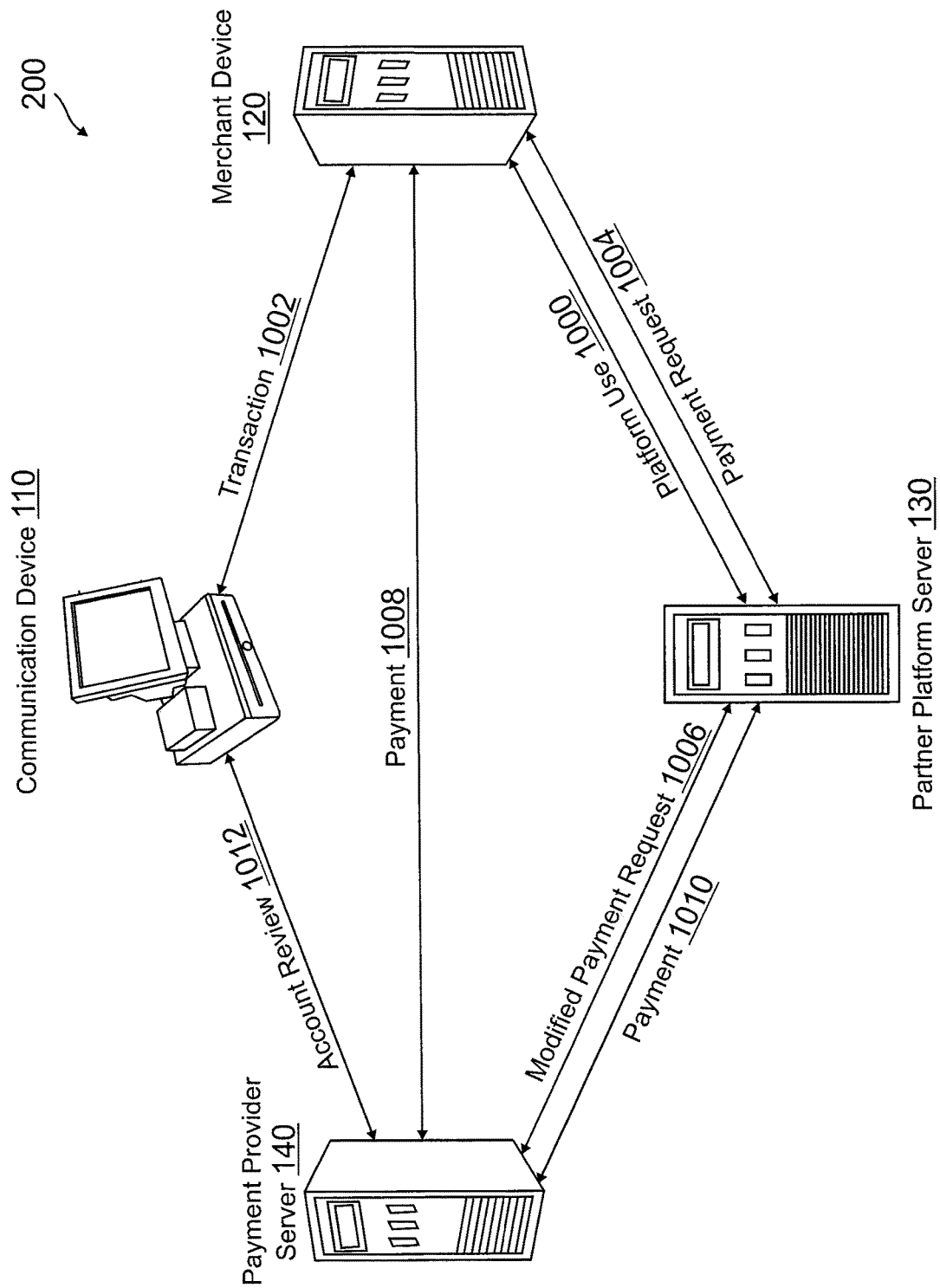
FIG. 2 is an exemplary environment of interacting devices for use in providing a split payment during a chain transaction; according to an embodiment.

FIG. 2 is an exemplary environment of interacting devices for use in providing a split payment during a chain transaction; according to an embodiment. Environment 200 of FIG. 2 includes a communication device 110, a merchant device 120, a partner platform server 130, and a payment provider server 140 having the hardware and software features discussed in reference to environment 100 of FIG. 1.

In environment 200, merchant device 120 may perform the first interaction with partner platform server 130 in order to utilize one or more of the services provided by partner platform server 130, such as an online marketplace, dedicated application, infrastructure, interfaces, software, or other capabilities. Such services may be used in the sale of one or more items by the merchant associated with merchant device 120. Thus, the first interaction shows a platform use 1000 by merchant device 120 and with partner platform server 130. Platform use 1000 may further establish split fee arrangements, such as a set or variable fee charged by partner platform server 130 for use of the services provided to merchant device 120. The fee arrangement may be stored by merchant device 120 and/or partner platform server 130, as well as communicated to payment provider server 140 for storage.

Once the merchant has listed one or more items for sale, a second interaction between communication device 110 and merchant device 120 shows a transaction 1002 between the user for communication device 110 and the merchant for merchant device 120. Transaction 1002 may include selection of one or more items for sale and generation of transaction information for purchase of the item(s). The transaction information may include a price for the item(s). Thus, transaction 1002 may further be used to generate payment request 1004 for a payment for the price of transaction 1002. Payment request 1004 is shown as an interaction between merchant device 120 and partner platform server 130 as payment request 1004 may utilize one or more of the services provided by partner platform server 130 to generate payment request 1004.

Once payment request 1004 has been generated, partner platform server 130 may provide modified payment request 1006 to payment provider server 140. Modified payment request 1006 occurs after the partner service for partner platform server 130 attaches to payment request 1004 and requests that a split payment be provided to the partner service based on use of services of partner platform server 130 during transaction 1002. Thus, modified payment request 1006 may be used to identify that partner platform server 130 requires split payment for the payment in payment request 1004. The split payment may correspond to a specified amount (e.g., $1), a percentage of the payment (e.g., 5%), or other negotiated fee.

In response to receive modified payment request 1006, payment provider server 140 may process a payment with merchant device 120 by providing a payment for the amount in payment request 1004 to a merchant account for the merchant associated with merchant device 120. The payment may be a full amount for the transaction and paid from a user payment account for the user of communication device 110. In this regard, the user of communication device 110 may only be aware of this payment to the merchant of merchant device 120. However, in order to satisfy the split payment request, payment provider server 140 may perform another interaction with partner platform server 130 shown as payment 1010 to the partner service of partner platform server 130. Payment 1010 may be for the split payment amount, and may be made from the merchant account for the merchant associated with merchant device 120 to a partner payment account for the partner service of partner platform server 130. Thus, during the interaction between communication device 110 and payment provider server 140 shown as account receive 1012, the user of communication device 110 may view a statement history that only shows a payment to the merchant associated with merchant device 120.

Figure 3:
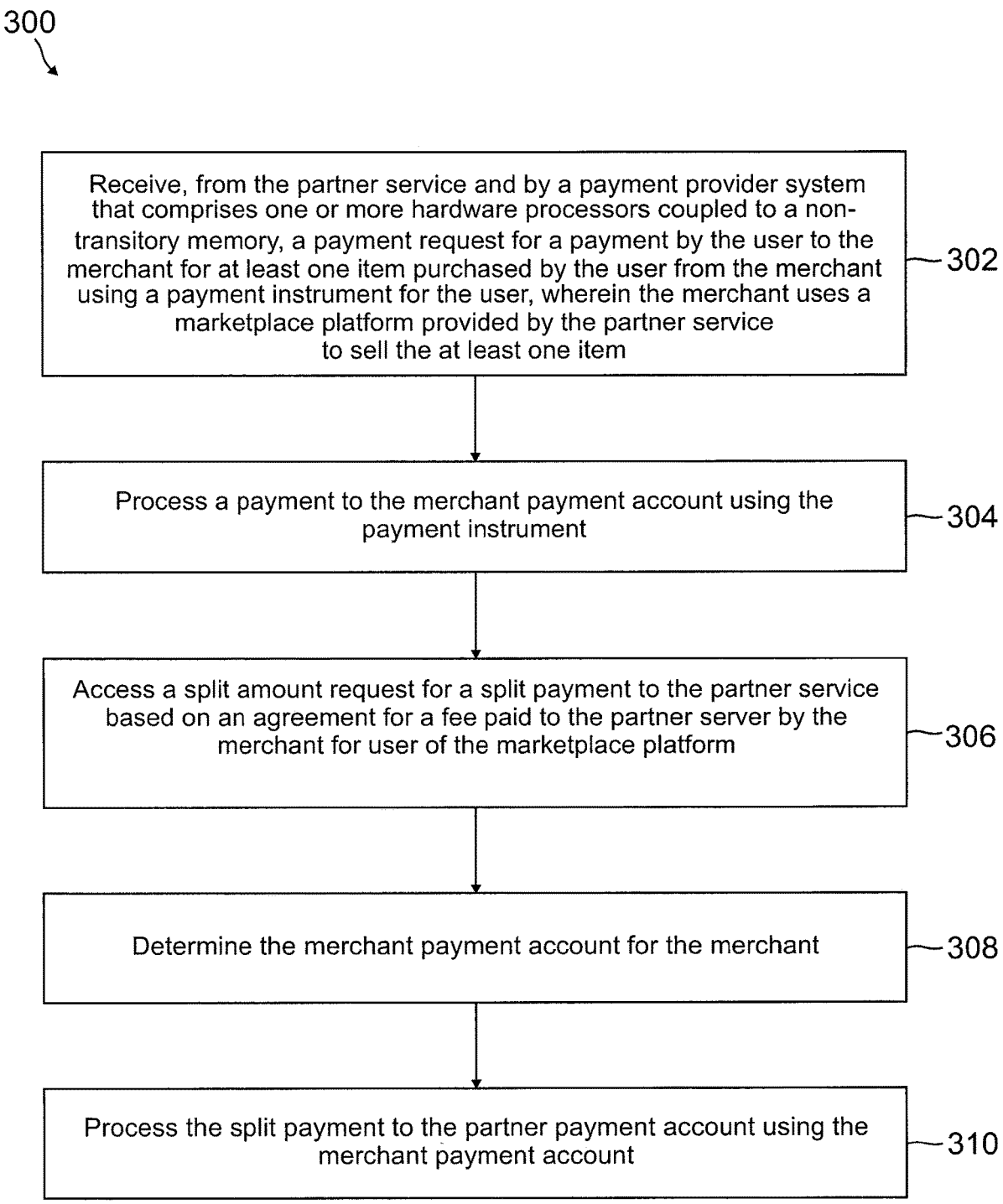
FIG. 3 is an exemplary process flowchart tokenized data having split payment instruction for multiple accounts in a chain transaction, according to an embodiment.

FIG. 3 is an exemplary process flowchart tokenized data having split payment instruction for multiple accounts in a chain transaction, according to an embodiment. Note that one or more steps, processes, and methods described herein may be omitted, performed in a different sequence, or combined as desired or appropriate.

At step 302, a payment request for a payment by the user to the merchant for at least one item purchased by the user from the merchant using a payment instrument for the user is received, from the partner service and by the payment provider's system that comprises one or more hardware processors coupled to a non-transitory memory, wherein the merchant uses a marketplace platform provided by the partner service to sell the at least one item. The payment instrument comprises a payment account with the payment provider system, wherein the payment by the user to the merchant debits the payment account of the user. The marketplace platform may comprise at least one of a website provided by the partner service and a dedicated application of the partner service that is executable by a mobile communication device.

A payment to the merchant payment account using the payment instrument is processed, at step 304. The payment instrument may correspond to a payment account with the payment provider, or may correspond to a credit/debit card or other financial account. The payment may be deposited to the merchant account prior to any fees being paid. A split amount request for a split payment to the partner service based on an agreement for a fee paid to the partner server by the merchant for use of the marketplace platform is accessed, at step 306. The split amount request may be received with the payment request. For example, the split amount request may be from the partner service, wherein the partner service attaches the split amount request to the payment request when transmitting the payment request to the payment provider system. The fee may be a variable fee set by the partner service, wherein the split amount depends on the variable fee. For example, the variable fee may depend on at least one of a ranking of the merchant by the partner service, a subscription held by the merchant with the partner service, the agreement for the variable fee, an amount of sales by the merchant, and a size of the merchant. Thus, the partner service may use the variable fee to determine the split amount and the split amount request for the payment request, wherein the partner service processes the variable fee with payment requests from the merchant to determine a different split amount required from the merchant for each of the payment request.

In various embodiments, the payment request is also generated by one of the partner service after receiving transaction details for the at least one item purchased by the user and the marketplace platform provided by the partner service when processing the at least one item purchased by the user. Moreover, the agreement between the merchant and the partner service may be established on one of registration of the merchant with the partner service for use of the partner service and submission of the at least one item for sale on the marketplace platform provided by the partner service. Additionally, the fee may be contingent on at least one of an amount in the payment request and a type of the payment request, and wherein the split amount is determine using the fee and the payment.

The split amount request may be received from the partner service after detection of the transaction processing and payment to the merchant. However, in other embodiments, the split amount request may be automatically generated by the payment provider during or after transaction processing based on known or received information indicating that the merchant utilizes the partner service's marketplace platform. At step 308, the merchant payment account is determined. And at step 310, the split payment is processed to the partner payment account using the merchant payment account. Thus, an amount for the split payment may be provided to the partner service in the partner service's payment account. The split amount may correspond to an agreed upon or negotiated fee for the transaction, such as for use of the partner service's platform or other infrastructure. The partner service may therefore provide assistance in generating the transaction and other sales for the merchant.

The partner service may comprise an agency providing payments to at least one other merchant, wherein the split fee request further comprises at least one additional split fee for the at least one other merchant. In certain embodiments, at least one additional split amount request for at least one additional split payment to the at least one other partner service is received. Thus, the at least one additional split amount request to the at least one other partner service is processed using the merchant payment account.

Figure 4:
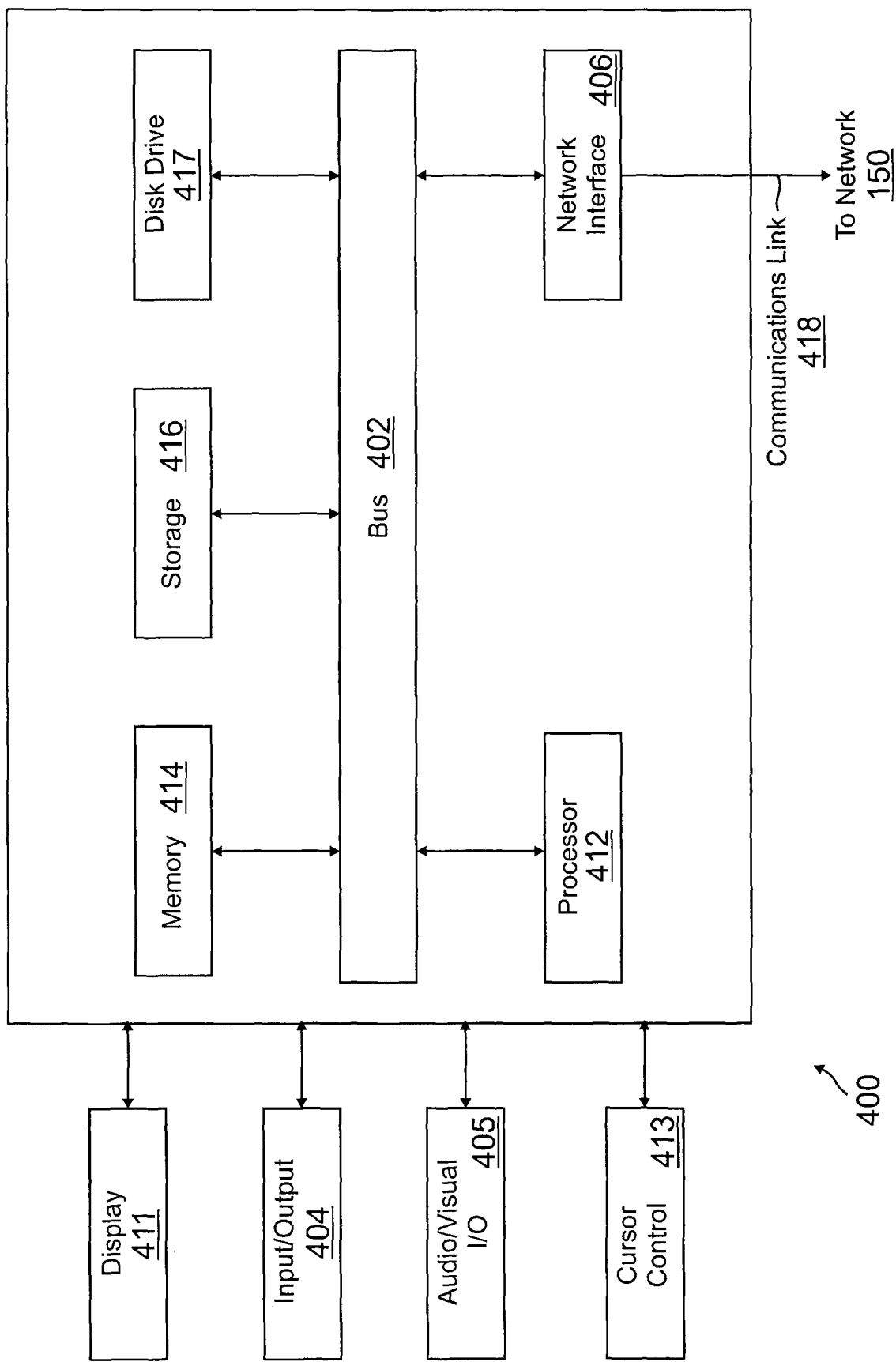
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another communication device, service device, or a service provider server via network 150. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system, comprising:
one or more hardware processors; and
a non-transitory computer-readable medium having stored thereon instructions that are executable by the one or more hardware processors to cause the computing system to perform operations comprising:
receiving, from a digital marketplace platform of a partner service, a digital token corresponding to a payment request from a user to a seller for a transaction for purchasing an item on the digital marketplace platform, wherein the digital token comprises tokenized payment data for a payment instrument and includes specified information usable to identify the payment instrument, and wherein the specified information includes a number corresponding to a primary account number (PAN) of a funding instrument, but wherein the PAN is not included in the digital token;
determining the payment instrument at least in part by processing the digital token;
processing a payment to a seller payment account for the seller using the payment instrument;
in response to receiving, from the digital marketplace platform, an application programming interface (API) call for a fee payment request, accessing an agreement for a fee paid to the partner service by the seller in connection with the purchasing of the item, wherein the agreement for the fee comprises an adjustable amount for the fee based on one or more specified transaction criteria selected from a group comprising at least one of: a ranking of the seller involved in the transaction by the partner service, a subscription held by the seller with the partner service, an amount of sales by the seller, or a size of the seller;
analyzing transaction data for the transaction with respect to the one or more specified transaction criteria;
based on a result of the analyzing, determining a split amount to the partner service for the payment request;
automatically generating the fee payment request for the split amount to the partner service; and
processing the fee payment request for the split amount to a partner account for the partner service using the seller payment account.

2. The computing system of claim 1, wherein the digital token is received via the API call.

3. The computing system of claim 1, wherein the specified information cannot be used to effectuate an electronic payment transaction by itself.

4. The computing system of claim 1, wherein the payment request is received from the user via the digital marketplace platform.

5. The computing system of claim 1, wherein the fee payment request is attached to the payment request by the digital marketplace platform.

6. A method, comprising:
receiving, at a computer system from a digital marketplace platform of a partner service, a digital token corresponding to a payment request from a user to a seller for a transaction for purchasing an item on the digital marketplace platform, wherein the digital token comprises tokenized payment data for a payment instrument and includes specified information usable to identify the payment instrument, and wherein the specified information includes a number corresponding to a primary account number (PAN) of a funding instrument, but wherein the PAN is not included in the digital token;
the computer system determining the payment instrument at least in part by processing the digital token;
the computer system processing a payment to a seller payment account for the seller using the payment instrument;
in response to receiving, from the digital marketplace platform, an application programming interface (API) call for a fee payment request, the computer system accessing an agreement for a fee paid to the partner service by the seller in connection with the purchasing of the item, wherein the agreement for the fee comprises an adjustable amount for the fee based on one or more specified transaction criteria that includes one or more of: a ranking of the seller involved in the transaction by the partner service, a subscription held by the seller with the partner service, an amount of sales by the seller, or a size of the seller;
the computer system analyzing transaction data for the transaction with respect to the one or more specified transaction criteria;
based on a result of the analyzing, the computer system determining a split amount to the partner service for the payment request;
the computer system automatically generating the fee payment request for the split amount to the partner service; and
the computer system processing the fee payment request for the split amount to a partner account for the partner service using the seller payment account.

7. The method of claim 6, wherein the adjustable amount for the fee is further based on one or more specified characteristics of the seller.

8. The method of claim 6, wherein processing the fee payment request comprises initiating a separate debit from the seller payment account to the partner account subsequent to causing proceeds for the payment to be placed in the seller payment account.

9. The method of claim 6, wherein the one or more specified transaction criteria further includes at least one of an amount of purchase or a type of payment request.

10. The method of claim 6, wherein a display device of the user that is used for the transaction does not show the split amount at any point during the transaction.

11. The method of claim 6, wherein the digital marketplace platform comprises at least one of a website provided by the partner service or a dedicated application of the partner service.

12. The method of claim 6, wherein the digital token is received from the partner service after receiving transaction details for the item purchased by the user or via the digital marketplace platform provided by the partner service when processing the item purchased by the user.

13. The method of claim 6, wherein the API call is received at a same time as the receiving the digital token.

14. The method of claim 6, wherein the fee payment request further comprises at least one additional fee for at least one other merchant.

15. A non-transitory computer-readable medium having stored thereon instructions that are executable by a computer system to cause the computer system to perform operations comprising:

receiving, from a digital marketplace platform of a partner service, a digital token corresponding to a payment request from a user to a seller for a transaction for purchasing an item on the digital marketplace platform, wherein the digital token comprises tokenized payment data for a payment instrument and includes specified information usable to identify the payment instrument, and wherein the specified information includes a number corresponding to a primary account number (PAN) of a funding instrument, but wherein the PAN is not included in the digital token;

determining the payment instrument at least in part by processing the digital token;

processing a payment to a seller payment account for the seller using the payment instrument;

in response to receiving, from the digital marketplace platform, an application programming interface (API) call for a fee payment request, accessing an agreement for a fee paid to the partner service by the seller in connection with the purchasing of the item, wherein the agreement for the fee comprises an adjustable amount for the fee based on one or more specified transaction criteria that includes: a ranking of the seller involved in the transaction by the partner service, a subscription held by the seller with the partner service, an amount of sales by the seller, or a size of the seller;

analyzing transaction data for the transaction with respect to the one or more specified transaction criteria;

based on a result of the analyzing, determining a split amount to the partner service for the payment request;

automatically generating the fee payment request for the split amount to the partner service; and processing the fee payment request for the split amount to a partner account for the partner service using the seller payment account.

16. The non-transitory computer-readable medium of claim 15, wherein processing the fee payment request comprises initiating a separate debit form the seller payment account to the partner account subsequent to causing proceeds for the payment to be placed in the seller payment account.

17. The non-transitory computer-readable medium of claim 15, wherein the one or more specified transaction criteria further includes at least one of an amount of purchase or a type of payment request.

18. The non-transitory computer-readable medium of claim 15, wherein the adjustable amount for the fee is further based on one or more specified characteristics of the seller.

19. The non-transitory computer-readable medium of claim 15, wherein a display device of the user that is used for the transaction does not show the split amount at any point during the transaction.

* * * * *